US010457207B2

(12) United States Patent
Lee

(10) Patent No.: US 10,457,207 B2
(45) Date of Patent: Oct. 29, 2019

(54) SOUND GENERATOR SYSTEM OF VEHICLE

(71) Applicants: Hyundai Motor Company, Seoul (KR); Kia Motors Corporation, Seoul (KR)

(72) Inventor: Sang Il Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 15/824,676

(22) Filed: Nov. 28, 2017

(65) Prior Publication Data
US 2019/0092231 A1 Mar. 28, 2019

(30) Foreign Application Priority Data
Sep. 25, 2017 (KR) .................. 10-2017-0123120

(51) Int. Cl.
*B60Q 9/00* (2006.01)
*G10K 15/04* (2006.01)
*H04R 9/06* (2006.01)
*G10K 9/20* (2006.01)
*G10K 15/02* (2006.01)
*B60Q 5/00* (2006.01)

(52) U.S. Cl.
CPC ................ *B60Q 9/00* (2013.01); *G10K 9/20* (2013.01); *G10K 15/02* (2013.01); *G10K 15/04* (2013.01); *H04R 9/06* (2013.01); *B60Q 5/008* (2013.01); *H04R 2499/13* (2013.01)

(58) Field of Classification Search
CPC .......... B60Q 9/00; B60Q 5/008; G10K 15/04; H04R 9/06; H04R 2499/13
See application file for complete search history.

(56) References Cited

U.S. PATENT DOCUMENTS

| 8,519,573 B2 * | 8/2013 | Keisuke .................. B06B 1/045 310/15 |
| 9,414,167 B2 | 8/2016 | Rostami |
| 2011/0129112 A1 | 6/2011 | Satoh |

FOREIGN PATENT DOCUMENTS

| JP | H0461594 B2 | 10/1992 |
| KR | 2010-0010228 A | 2/2010 |
| KR | 20100010228 A * | 2/2010 |

(Continued)

*Primary Examiner* — James J Yang
*Assistant Examiner* — Kevin Lau
(74) *Attorney, Agent, or Firm* — Mintz Levin Cohn Ferris Glovsky and Popeo, P.C.; Peter F. Corless

(57) ABSTRACT

A sound generator system of a vehicle is provided. The system includes a housing with an interior space formed therein and a cover that encloses the housing. An exciter is inserted into the interior space and includes yokes and a magnetic. A coil is positioned adjacent to the exciter and vibrates the exciter when current is applied. A main shaft has a first end connected to the housing a second end penetrating the cover, exposed to an outside, and penetrated and installed in the exciter and the vibration generated by the exciter if finally output. An elastic portion is installed adjacent to the exciter and delivers the vibration to the main shaft to remove removing a horizontal directional driving force of the exciter and prevent the exciter from contacting other components and enhances a vertical directional driving force of the exciter.

11 Claims, 12 Drawing Sheets

(56) References Cited

FOREIGN PATENT DOCUMENTS

| KR | 2010-0120894 A | | 11/2010 |
|----|----------------|---|---------|
| KR | 20100120894 A | * | 11/2010 |
| KR | 2011-0073844 A | | 6/2011 |
| KR | 2014-0110126 A | | 9/2014 |
| KR | 2015-0088145 A | | 7/2015 |
| KR | 2016-0090640 A | | 8/2016 |
| KR | 2017-0075373 A | | 7/2017 |

* cited by examiner

SOUND GENERATOR SYSTEM OF VEHICLE

CROSS REFERENCE TO RELATED APPLICATION

The present application claims priority of Korean Patent Application No. 10-2017-0123120 filed on Sep. 25, 2017, the entire contents of which is incorporated herein for all purposes by this reference.

BACKGROUND

Field of the Invention

The present invention relates to a sound generator system of a vehicle, and more particularly, to a sound generator system of a vehicle that amplifies part of the noise generated in an engine of the vehicle by vibration and delivering the noise to a driver to provide an active driving feeling.

Description of the Related Art

Conventionally, the noise generated in vehicle while the vehicle is being driven is blocked and a research for blocking the noise has been actively conducted. However, as recent technology of the vehicle develops, for a hybrid vehicle or an electric vehicle, in driving using only a motor, the driving sound of an engine is remarkably reduced compared with in operation of the engine. Accordingly, a pedestrian may not recognize the approach of the vehicle and also, the noise reduction reduces a speed feeling or driving feeling experienced by a driver.

Recently, for resolving such circumstances, a sound generator system such as a virtual engine sound system has been developed. The sound generator system outputs virtual engine sound and warning sound through a speaker to allow the pedestrian to more easily recognize or detect the approach of the vehicle, or amplifies part of the noise generated in the engine of the vehicle by vibration to perform a function of delivering the noise to the driver, and the like. However, in a conventional sound generator system of the vehicle, a vibration generating force is reduced due to an excessive gap formed in the system components; a coil exists between the yokes vibrating in the vertical direction to thereby be damaged; and a size thereof increases due to the gap.

The foregoing is intended merely to aid in the understanding of the background of the present invention, and is not intended to mean that the present invention falls within the purview of the related art that is already known to those skilled in the art.

SUMMARY

The present invention provides a sound generator system of a vehicle that amplifies part of the noise generated in an engine by vibration, thereby efficiently delivering the noise to a driver while enhancing durability of a component of the system.

A sound generator system of a vehicle according to the present invention may include a housing with an interior space formed; a cover that encloses the housing; a exciter inserted in the interior space and having a plurality of yokes and a magnetic; a coil positioned adjacent to the exciter and configured to cause the exciter to vibrate when current is applied thereto; a main shaft with a first end connected to the housing and a second end penetrating the cover, exposed to an outside, and penetrated and installed into the exciter, and thereby the vibration generated by the exciter may output; and an elastic portion installed adjacent to the exciter and configured to deliver the vibration generated by the exciter to the main shaft, to remove a horizontal directional driving force of the exciter to prevent the exciter from being rubbed with (e.g., decreasing friction between the components) other components and enhancing a vertical directional driving force of the exciter.

The elastic portion may be configured to include a first plate spring that adds an elastic force and a spacer that maintains the first plate spring and the exciter to be spaced from each other at a predetermined distance. The first plate spring may include a first fixing portion connected and fixed to the main shaft and a first excitation portion excited by the exciter, the first fixing portion and the first excitation portion may be connected to each other by a first connecting portion; and the vibration generated by a vertical directional operation of the first excitation portion due to the vibration of the exciter may be delivered to the main shaft through the first connecting portion and the first fixing portion.

The housing may be formed with a fastening portion that protrudes toward the interior space side and the main shaft may be formed with an extension portion that extends in the radial direction; and the first plate spring may be interposed between the fastening portion and the extension portion to be fixable even without separate fastening member. The fastening portion may be formed with a fastening space therein; the fastening space may be formed with a cross-shaped cross groove; and a first end of the main shaft may be protruded and formed with a cross protrusion having a shape that corresponds to the cross groove to prevent the main shaft from being rotated and separated upon the vibration of the exciter.

Additionally, the cover may be formed with a protrusion portion that protrudes toward the interior space side; the main shaft may be formed with an extension portion that extends in the radial direction; and the first plate spring may be interposed between the protrusion portion and the extension portion to be fixable even without separate fastening member. The elastic portion may be configured to include a fixing member connected to the main shaft and a second plate spring with a first end connected with the fixing member and a second end connected with the exciter.

The second plate spring may be formed with a longitudinal direction thereof greater than the width thereof; the second end of the second plate spring may be formed with a bending portion bent at a predetermined distance; and the bending portion may be formed with a first end and a second end that form a predetermined height to maintain the exciter and the second plate spring by the bending portion to be spaced from each other at a predetermined distance.

Further, the second plate spring may be formed with the longitudinal direction thereof greater than the width; the second end of the second spring may be bent at a predetermined distance for directing the same direction as a first end thereof to form a bending portion; and the exciter and the second plate spring may be maintained by the bending portion to be spaced from each other at a predetermined distance. A plurality of the second plate springs may be formed to be spaced in the radial direction of the exciter to restrict the horizontal directional movement of the exciter and to enhance the vertical directional driving force.

The elastic portion may include a third plate spring that adds an elastic force and a plurality of mounting members with both end portions of the third plate spring mounted The mounting member may have a hollow ring shape and may include a first mounting member with a fixing groove, to which a first end of the third plate spring may be fixed, recessed and formed on one surface thereof and a second mounting member with a sliding groove, in which the second end of the third plate spring may be slid along the circumferential direction, recessed and formed on one surface thereof, and the fixing groove and the sliding groove may be formed at the opposite location.

The third plate spring may include a parallel portion with a first end and a second end formed in parallel to the exciter and a center portion forming a diagonal line in the exciter, and the plurality of mounting members may be maintained by the center portion to be spaced from each other at a predetermined height. The mounting member may include a second fixing portion connected to the main shaft and a second excitation portion excited by the exciter, the second fixing portion and the second excitation portion may be connected to each other by a second connecting portion; and the vibration excited by the sliding of the third plate spring within the second excitation portion upon vibration of the exciter may be delivered to the main shaft through the second connecting portion and the second fixing portion.

The elastic portion may include a coil spring configured to provide an elastic force and an inserting member may be formed with a receiving groove, into which the coil spring may be inserted and mounted. The inserting member may include a third fixing member connected to the main shaft and a third excitation portion excited by the exciter, the third fixing portion and the third excitation portion may be formed to be connected to each other by a third connecting portion; and a plurality of the receiving grooves may be formed to be spaced from each other at a predetermined interval on the third excitation portion. The coil spring may be inserted into and mounted to the receiving groove and the height of the coil spring mounted in the receiving groove may be formed to be higher than that of the third excitation portion.

According to the sound generator system of the vehicle consisting of the structure as described above, by delivering the force of the exciter directly to the main shaft without passing through the housing or the cover, the delivery path that the exciting force of the exciter is delivered to the vehicle body is reduced and simplified, thereby minimizing loss of the driving force and enhancing the driving force. Further, the stiffness of the housing may be increased and a frequency use band may be broadly obtained.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a sound generator system of a vehicle according to an exemplary embodiment of the present invention will be described with reference to the accompanying drawings.

Figure 1:
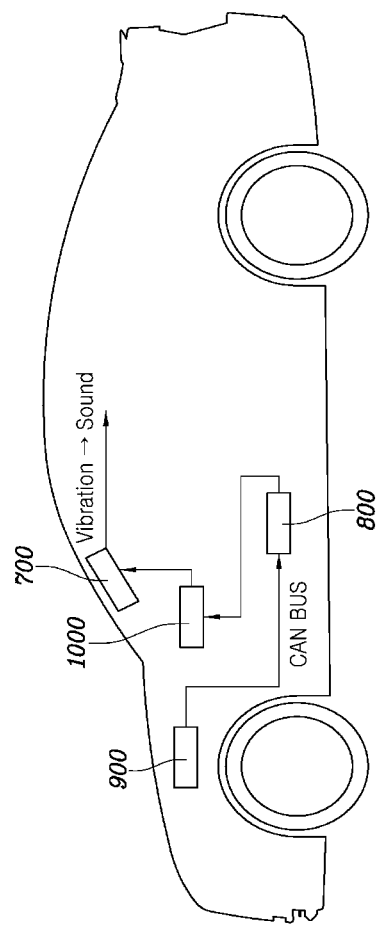
FIG. 1 is a view illustrating that a sound generator system of a vehicle according to one exemplary embodiment of the present invention is installed in the vehicle.
Figure 2:
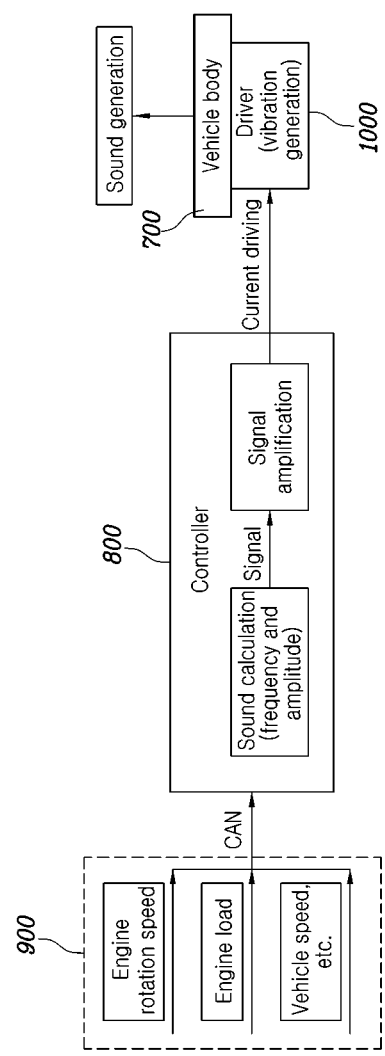
FIG. 2 is a view illustrating a control of the sound generator system of the vehicle according to one exemplary embodiment of the present invention.
Figure 3:
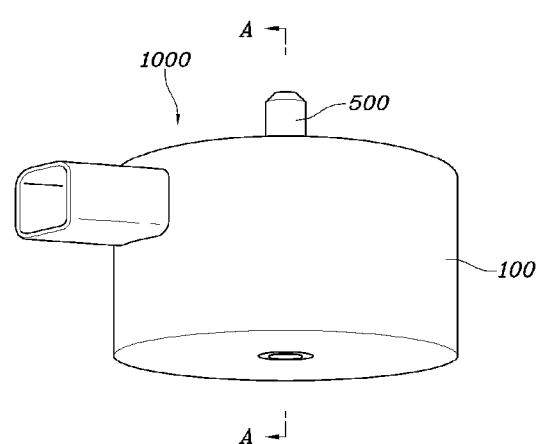
FIG. 3 is a view illustrating the sound generator system of the vehicle according to a first exemplary embodiment of the present invention.
Figure 4:
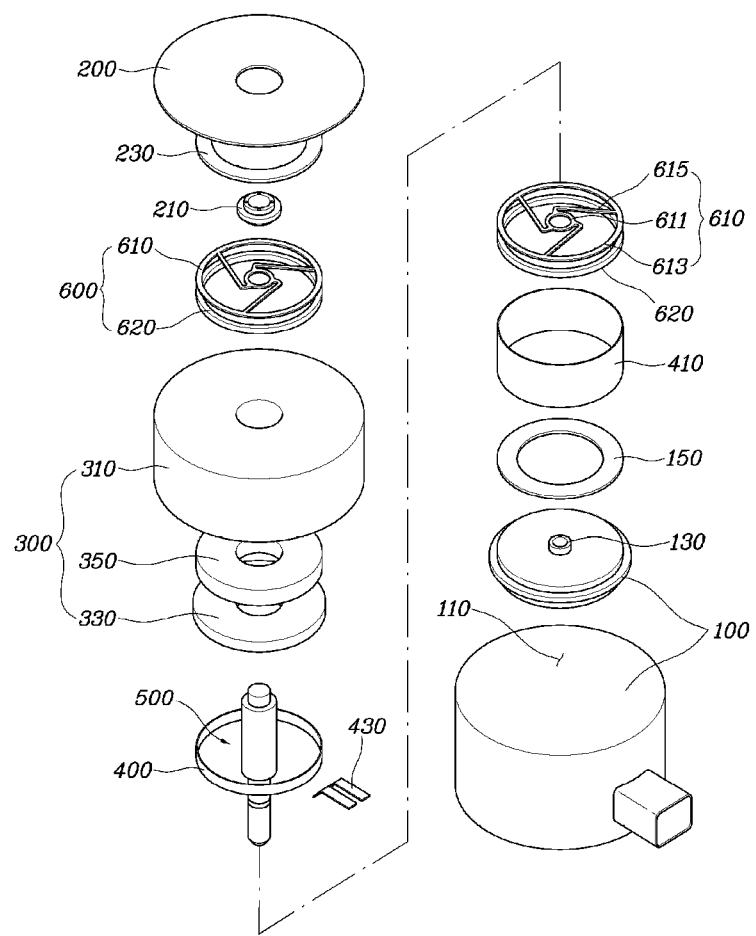
FIG. 4 is an exploded perspective view of FIG. 3 according to an exemplary embodiment of the present invention.
Figure 5:
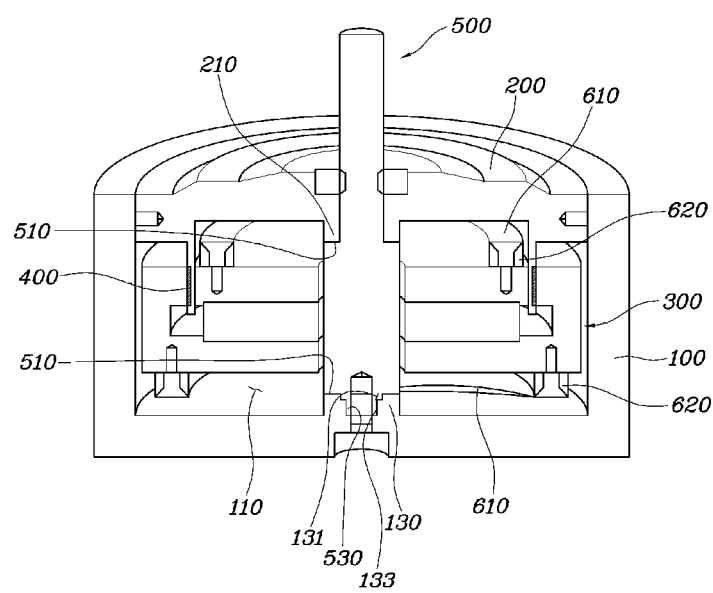
FIG. 5 is a cross-sectional view taken on line A-A of FIG. 3 according to an exemplary embodiment of the present invention.
Figure 6:
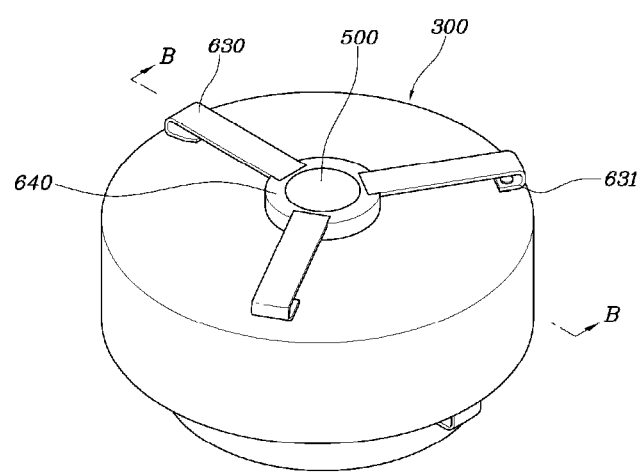
FIG. 6 is a view illustrating the sound generator system of the vehicle according to a second exemplary embodiment of the present invention.
Figure 7:
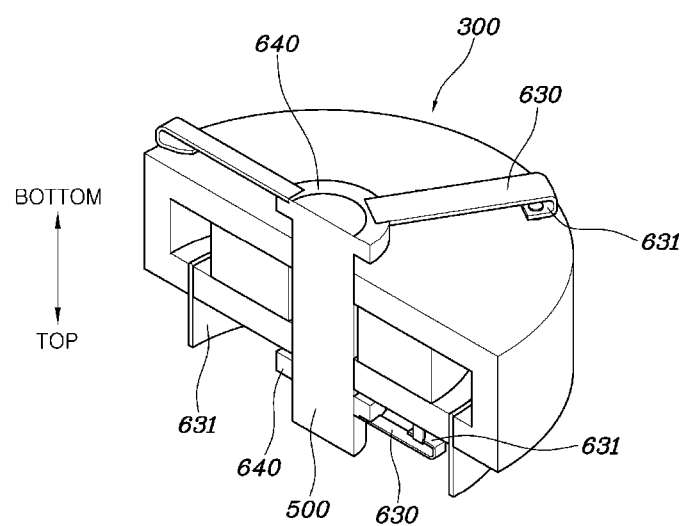
FIG. 7 is a cross-sectional view taken on line B-B of FIG. 6 according to an exemplary embodiment of the present invention.
Figure 8:
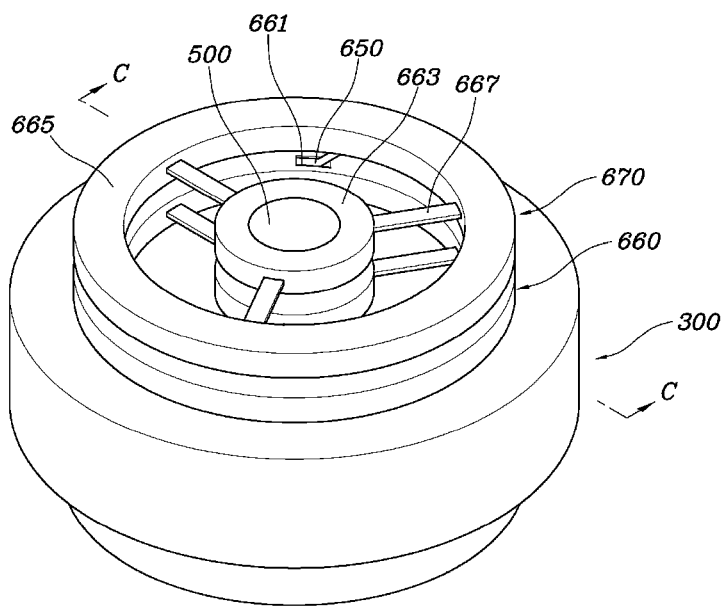
FIG. 8 is a view illustrating the sound generator system of the vehicle according to a third exemplary embodiment of the present invention.
Figure 9:
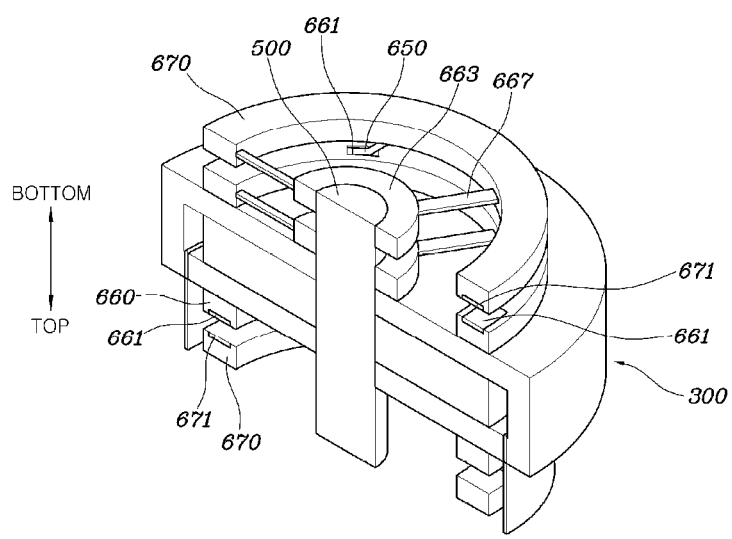
FIG. 9 is a cross-sectional view taken on line C-C of FIG. 8 according to an exemplary embodiment of the present invention.

FIG. 1 is a view illustrating that a sound generator system of a vehicle according to one exemplary embodiment of the present invention is installed in the vehicle and FIG. 2 is a view illustrating a control of the sound generator system of the vehicle according to one exemplary embodiment of the present invention. FIG. 3 is a view illustrating the sound generator system of the vehicle according to a first exemplary embodiment of the present invention; FIG. 4 is an exploded perspective view of FIG. 3; and FIG. 5 is a cross-sectional view taken on line A-A of FIG. 3. FIG. 6 is a view illustrating the sound generator system of the vehicle according to a second exemplary embodiment of the present invention and FIG. 7 is a cross-sectional view taken on line B-B of FIG. 6. Further, FIG. 8 is a view illustrating the sound generator system of the vehicle according to a third exemplary embodiment of the present invention; FIG. 9 is a cross-sectional view taken on line C-C of FIG. 8; and FIG.

Figure 11:
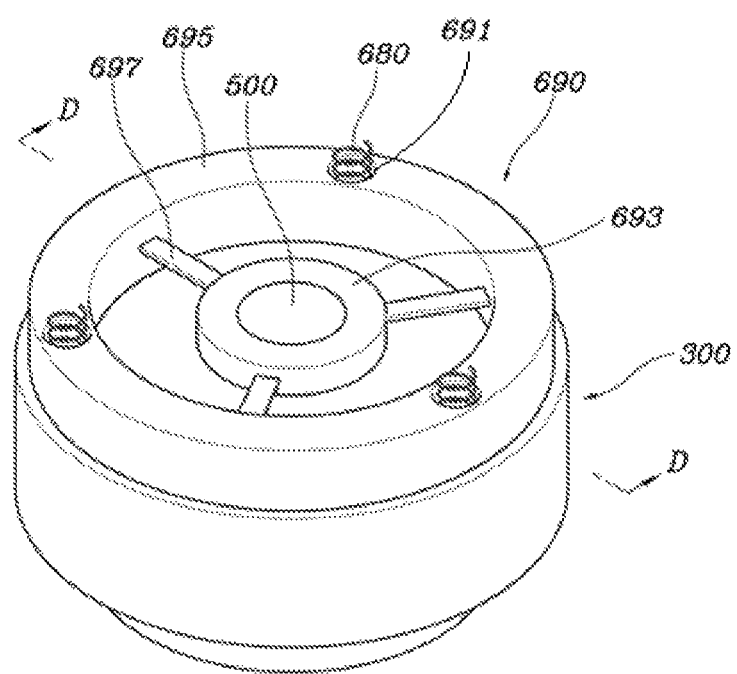
FIG. 11 is a view illustrating the sound generator system of the vehicle according to a fourth exemplary embodiment of the present invention.
Figure 12:
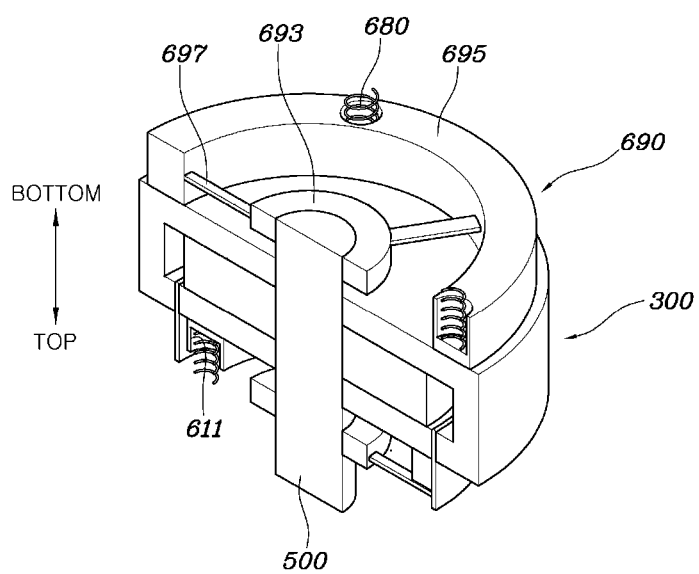
FIG. 12 is a cross-sectional view taken on line D-D of FIG. 11 according to an exemplary embodiment of the present invention.

10 is a detailed view illustrating a fixing groove 661 and a sliding groove 671 of FIG. 9. FIG. 11 is illustrating the sound generator system of the vehicle according to a fourth exemplary embodiment of the present invention and FIG. 12 is a cross-sectional view taken on line D-D of FIG. 11.

As illustrated in FIGS. 1 and 2, a vehicle may be installed with a sound generator system 1000. The sound generator system 1000 may be positioned on a front side of the vehicle, particularly, a cowl panel and a windshield glass and the like side. A controller 900 may be configured to collect information regarding each component of the vehicle, for example, information regarding a rotation speed of an engine, load of the engine, and a vehicle speed and the like. The controller 900 may further be configured to collect the information from each component of the vehicle and then deliver a signal to a controller 800 of the sound generator system 1000 via controller area network (CAN) communication; and the controller 800 may be configured to calculate and amplify necessary sound and then apply current or voltage to the sound generator system to drive the sound generator system 1000. Further, the vibration generated in the sound generator system 1000 may be delivered to the cowl panel or the windshield glass and the like being a vehicle body 700 to generate the sound. The generated sound may be delivered to a user.

As illustrated in FIG. 3, the sound generator system 1000 of the vehicle according to one exemplary embodiment of the present invention may include a housing 100 with an interior space 110 formed therein; a cover 200 that encloses the housing 100; an exciter 300 inserted into the interior space 110 and having a plurality of yokes 310, 330 and a magnetic 350; a coil 400 positioned adjacent to the exciter 300 and configured to cause the exciter 300 to vibrate when current is applied thereto; a main shaft 500 with a first end connected to the housing 100, a second end penetrating the cover 200, exposed to an outside, and penetrated and installed on the exciter 300; and thereby the vibration generated by the exciter 300 may be finally output; and an elastic portion installed adjacent to the exciter 300 and configured to deliver the vibration generated by the exciter 300 to the main shaft 500; thereby removing a horizontal directional driving force of the exciter 300 to prevent the exciter 300 from being rubbed with other components (e.g., friction between the components) and to enhance a vertical directional driving force of the exciter 300.

The housing 100 may be formed with the interior space 110 being receivable therein and the housing 100 may include the cover 200 that encloses the housing 100. The interior space 110 of the housing 100 may receive the exciter 300. The exciter 300, as a general exciter 300 may include the plurality of yokes 310, 330 and the magnetic 350. The plurality of yokes 310, 330 may include an upper yoke 310 and a lower yoke 330 and the magnetic 350 may be interposed between the upper yoke 310 and the lower yoke 330. Further, the coil 400 may be installed adjacent to the exciter 300; the coil 400 may be connected with a terminal 430; and when current or voltage is applied to the coil 400 through the terminal 430, the coil 400 vibrates the exciter 300. Further, the coil 400 may be wound around a bobbin 410 formed on the cover 200 and the coil 400 may be inserted into a gap formed by the upper yoke 310 and the lower yoke 330.

In other words, when anent is applied to the coil 400, the direction of current is formed along the coil 400 wound around the bobbin 410. Particularly, the direction of magnetic flux in the radial direction of the exciter 300 may be formed in the magnetic 350 of the exciter 300 and according to a Fleming's left-hand law, a force in the vertical direction in the exciter 300 may be generated to thereby be vibrated. Additionally, a plurality of stopper 150, 230 may be interposed between the cover 200 and the elastic portion and between the housing 100 and the elastic portion to prevent an excessive vertical movement of the elastic portion.

The main shaft 500 may have a first end connected to the housing 100 and a second end that penetrates the cover 200 and the main shaft 500 may be exposed to an outside. The main shaft 500 may be penetrated into and installed in the exciter 300. Further, the elastic portion may also be penetrated into and installed in the main shaft 500 to be connected with the main shaft 500. Accordingly, upon operation of the exciter 300, the vibration generated by the exciter 300 does not pass through the housing 100 or the cover 200 and immediately after passing through the elastic portion, may be finally output to the vehicle body 700 through the main shaft 500; and accordingly, the sound generated by a driving force enhancing the driving force by decreasing the delivery path may be delivered to a user.

The elastic portion may be installed adjacent to the exciter 300 and may be configured to deliver the vibration generated by the exciter 300 to the main shaft 500. Accordingly, a horizontal directional driving force of the exciter 300 may be removed to prevent the exciter 300 from contacting other components and to enhance a vertical directional driving force of the exciter 300. The elastic portion may include an elastic member 610, 630, 650, 680 and a supporting member 620, 640, 660, 670, 690 that supports the elastic member 610, 630, 650, 680; the present specification illustrates and describes four exemplary embodiments as examples, but it is not necessarily limited thereto; and the design modification thereof will be available as much as possible when the vibration generated by the exciter 300 may be outputted directly to the main shaft 500 through the elastic member 610, 630, 650, 680.

Each exemplary embodiment of the elastic portion will be described with reference to the drawings. FIGS. 3 to 5 are views illustrating the sound generator system of the vehicle according to a first exemplary embodiment of the present invention and the elastic portion may include a first plate spring 610 that increases the elastic force and a spacer that maintains a space between the first plate spring 610 and the exciter 300 at a predetermined distance. The elastic portion may be formed on one end and the other end of the exciter 300, respectively.

The first plate spring 610 may include a first fixing portion 611 connected and fixed to the main shaft 500 and a first excitation portion 613 excited by the exciter 300. The first fixing portion 611 and the first excitation portion 613 may be a concentric ring shape. Further, the first fixing portion 611 and the first excitation portion 613 may be connected to each other by a first connecting portion 615 and the vibration generated by operation of the first excitation portion 613 in the vertical direction due to the vibration of the exciter 300 may be delivered to the main shaft 500 through the first connecting portion 615 and the first fixing portion 611. In other words, the first plate spring 610 may be fixed to the main shaft 500 by the first fixing portion 611, and thereby an exciting force generated upon operation of the exciter 300 may be prevented from being delivered to other members or components such as the housing 100 or the cover 200 and the like and delivered directly to the main shaft 500 to enhance the driving force.

The first plate spring 610 may be interposed between the exciter 300 and the housing 100 and between the exciter 300 and the cover 200. Particularly, the housing 100 may be formed with a fastening portion 130 that protrudes toward the interior space 110 side and the main shaft 500 may be formed with an extension portion 510 that extends in the radial direction. Accordingly, the first plate spring 610 may be interposed between the fastening portion 130 and the extension portion 510 to fix the components even without requiring a separate fastening member. Likewise, the cover 200 may be formed with a protrusion portion 210 that protrudes toward the interior space 110 side; the main shaft 500 may be formed with the extension portion 510 that extends in the radial direction; and the first plate spring 610 may be interposed between the protrusion portion 210 and the extension portion 510 to fix the components even without requiring a separate fastening member.

Particularly, the fastening portion 130 of the housing 100 may be formed with a fastening space 131 therein and the fastening space 131 may be formed with a cross groove 133 having a cross shape. A first end of the main shaft 500 may be protruded and formed with a cross protrusion 530 having the shape that corresponds to the cross groove 133. Accordingly, the cross protrusion 530 may be inserted into and fixed to the cross groove 133 to fix the connection and prevent the main shaft 500 from being rotated and separated by the vibration upon operation of the exciter 300.

FIGS. 6 and 7 are views illustrating the sound generator system of the vehicle according to a second exemplary embodiment of the present invention and the elastic portion may include the fixing member 640 connected to the main shaft 500 and a second plate spring 630 with a first end connected with the fixing member 640 and a second end connected with the exciter 300. The elastic portion may be formed on one end and the other end of the exciter 300, respectively.

The second plate spring 630 may be formed with the longitudinal direction or length thereof being greater than the width thereof. Particularly, the second end of the second plate spring 630 may be bent at a predetermined distance to form a bending portion 631. The bending portion 631 may be formed with a first end and a second end that form a predetermined height to maintain the exciter 300 and the second plate spring 630 to be spaced from each other at a predetermined distance by the bending portion 631. Further, the second end of the second plate spring 630 may be bent at a predetermined distance for directing the same direction as a first end thereof to form the bending portion 631. Accordingly, the exciter 300 and the second plate spring 630 may be maintained to be spaced from each other at a predetermined distance by the bending portion 631.

The fixing member 640 may be formed as a ring shape to be penetrated into and connected to the main shaft 500. Further, a plurality of the second plate springs 630 may be formed to be spaced in the radial direction of the exciter 300 to more stably restrict the horizontal directional movement of the exciter 300 and enhance the vertical directional driving force. Accordingly, when the exciter 300 is operated and vibrates in the vertical direction, the second plate spring 630 may also be deformed in the vertical direction within the elastic limit to deliver the exciting force to the main shaft 500. Particularly, in the second exemplary embodiment, the structure of the second plate spring 630 may be simplified and thus assembly, production, and quality management may be simplified.

Figure 10:
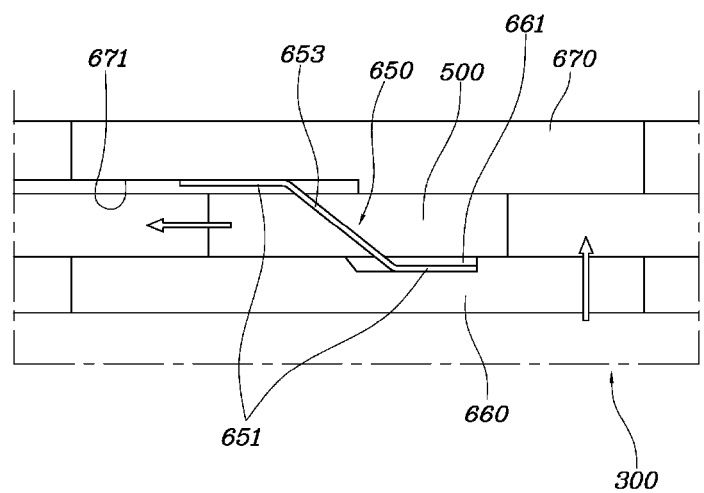
FIG. 10 is a detailed view illustrating a fixing groove and a sliding groove of FIG. 9 according to an exemplary embodiment of the present invention.

FIGS. 8 to 10 are views illustrating the sound generator system of the vehicle according to a third exemplary embodiment of the present invention and the elastic portion may include a third plate spring 650 that increases the elastic force and a plurality of mounting members with both end portions of the third plate spring 650 mounted thereon. The elastic portion may be formed on one end and the other end of the exciter 300, respectively.

The mounting member may be formed as a hollow ring shape, and this exemplary embodiment illustrates and describes that two mounting members are installed on a first end of the exciter 300 and two mounting members are installed on a second end thereof, respectively. Of course, the number of the mounting member is applicable to modify as much as possible if necessary. The mounting member 20 may include a first mounting member 660 with a fixing groove 661, to which a first end of the third plate spring 650 is fixed, recessed and formed and a second mounting member 670 with a sliding groove 671, in which a second end of the third plate spring 650 is slid along the circumferential direction, recessed and formed. The fixing groove 661 and the sliding groove 671 may be formed at the opposite location, particularly, the first mounting member 660 in which the fixing groove 661 is formed may be installed closer to the exciter 300 and the second mounting member 670 in which the sliding groove 671 is formed may be installed further away from the exciter 300 and thus, the delivery range of the exciting force generated upon operation of the exciter 300 may be increased.

Further, the third plate spring 650 may include a parallel portion 651 with a first end and a second end formed in parallel to the exciter 300 and a center portion 653 that forms a diagonal line in the exciter 300. The parallel portion 651 of the third plate spring 650 may be inserted into the fixing groove 661 and the sliding groove 671, respectively, to maintain the plurality of the mounting members to be spaced from each other at a predetermined distance.

The mounting member may include a second fixing portion 663 having a ring shape and connected to the main shaft 500 and a second exciter 665 having a ring shape excited by the exciter 300 and having concentric with the second fixing portion 663; and the second fixing portion 663 and the second excitation portion 665 may be connected to each other by a second connecting member 667. Accordingly, the vibration excited by the sliding of the third plate spring 650 within the second excitation portion 665 upon the vibration of the exciter 300 may be delivered to the main shaft 500 through the second connecting portion 667 and the second fixing portion 663. The second fixing portion 663, the second excitation portion 665, and the second connecting portion 667 may all be formed in the first mounting member 660 and the second mounting member 670 and formed only in the second mounting member 670 actually excited. Accordingly, in the third exemplary embodiment above, assembly and production may be simplified and the third plate spring 650 is may be slid, thereby absorbing the horizontal directional displacement and enhancing the vertical directional driving force.

FIGS. 11 and 12 are views illustrating the sound generator system of the vehicle according to a fourth exemplary embodiment of the present invention and the elastic portion may include a coil spring 680 that provides the elastic force and the inserting member 690 with the receiving groove 691, into which the coil spring 680 may be inserted and mounted. The elastic portion may be formed on one end and the other end of the exciter 300.

In particular, the inserting member 690 may include a third fixing portion 693, formed as a ring shape, connected to the main shaft 500 and a third excitation portion 695, formed as a ring shape, formed to have concentric with the third fixing portion 693 and excited by the exciter 300; the third fixing portion 693 and the third excitation portion 695 may be formed to be connected to each other by a third connecting portion 697. A plurality of the receiving grooves 691, into which the coil spring 680 is inserted and mounted, may be formed to be spaced from each other at a predetermined distance in the third excitation portion 695. The receiving groove 691 is configured so that a near side from the exciter 300 is closed and a far side therefrom is opened. Accordingly, a first end adjacent to the exciter 300 of the coil spring 680 may be fixed to the receiving groove 691 and a second end away from the exciter 300 may be a free end, thereby deforming the driving force generated by the exciter 300 within the elastic limit of the coil spring 680 and delivering the enhanced driving force to the main shaft 500.

Further, the coil spring 680 may be inserted into and mounted to the receiving groove 691 and the height of the coil spring 680 mounted to the receiving groove 691 may be formed higher than that of the third excitation portion 695, thereby further enhancing the exciting force generated upon operation of the exciter 300 and delivering it to the main shaft 500. In the fourth exemplary embodiment, the horizontal directional stiffness may be designed in consideration of a shape of the third excitation portion 695 in which the receiving groove 691 may be formed and the vertical directional stiffness may be designed in consideration of the coil spring 680, thereby enhancing the design degree of freedom.

Therefore, according to the sound generator system of the vehicle of the present invention as described above, there have the effects that by delivering the force of the exciter 300 directly to the main shaft 500 without passing through the housing 100 or the cover 200, the delivery path that the exciting force of the exciter 300 is delivered to the vehicle body 700 may be reduced and simplified, thereby minimizing loss of the driving force and enhancing the driving force. Further, there has the advantage that may enhance the stiffness of the housing 100 and broadly obtain a frequency use band.

Although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A sound generator system of a vehicle, comprising:
a housing with an interior space formed therein;
a cover that encloses the housing;
an exciter inserted the interior space and having a plurality of yokes and a magnetic;
a coil positioned adjacent to the exciter and configured to cause the exciter to vibrate when current is applied thereto;
a main shaft with a first end connected to the housing; a second end penetrating the cover, exposed to an outside, and penetrated and installed into the exciter; and to finally output the vibration generated by the exciter; and
an elastic portion installed adjacent to the exciter and configured to deliver the vibration generated by the exciter to the main shaft,
wherein the elastic portion includes a first plate spring that increases an elastic force and a spacer that maintains the first plate spring and the exciter to be spaced from each other at a predetermined distance,
wherein the housing is formed with a fastening portion that protrudes toward the interior space side and the main shaft is formed with an extension portion that extends in the radial direction, and the first plate spring is interposed between the fastening portion and the extension portion to be fixable, and
wherein the fastening portion is formed with a fastening space therein that has a cross-shaped cross groove, and a first end of the main shaft is protruded and formed with a cross protrusion having a shape that corresponds to the cross groove to prevent the main shaft from being rotated and separated upon the vibration of the exciter.

2. The sound generator system of the vehicle according to claim 1, wherein the first plate spring includes a first fixing portion connected and fixed to the main shaft and a first excitation portion excited by the exciter; the first fixing portion and the first excitation portion are connected to each other by a first connecting portion; and the vibration generated by a vertical directional operation of the first excitation portion due to the vibration of the exciter is delivered to the main shaft through the first connecting portion and the first fixing portion.

3. The sound generator system of the vehicle according to claim 1, wherein the cover is formed with a protrusion portion that protrudes toward the interior space side, the main shaft is formed with an extension portion that extends in the radial direction, and the first plate spring is interposed between the protrusion portion and the extension portion to be fixable.

4. A sound generator system of a vehicle, comprising:
a housing with an interior space formed therein;
a cover that encloses the housing;
an exciter inserted the interior space and having a plurality of yokes and a magnetic;
a coil positioned adjacent to the exciter and configured to cause the exciter to vibrate when current is applied thereto;
a main shaft with a first end connected to the housing; a second end penetrating the cover, exposed to an outside, and penetrated and installed into the exciter; and to finally output the vibration generated by the exciter; and
an elastic portion installed adjacent to the exciter and configured to deliver the vibration generated by the exciter to the main shaft,
wherein the elastic portion includes a fixing member connected to the main shaft and a second plate spring with a first end connected with the fixing member and a second end connected with the exciter, and
wherein the second plate spring is formed in plurality to be spaced from each other in the radial direction of the exciter to restrict the horizontal directional movement of the exciter and to enhance the vertical directional driving force.

5. The sound generator system of the vehicle according to claim 4, wherein the second plate spring is formed with a longitudinal direction thereof greater than a width thereof; a second end of the second plate spring is formed with a bending portion bent at a predetermined distance; and the bending portion is formed with a first end and a second end that form a predetermined height to maintain the exciter and the second plate spring by the bending portion to be spaced from each other at a predetermined distance.

6. The sound generator system of the vehicle according to claim 4, wherein the second plate spring is formed with a the longitudinal direction thereof greater than a width thereof; a second end of the second spring is bent at a predetermined distance for directing the same direction as a first end thereof to form a bending portion; and the exciter and the second plate spring are maintained by the bending portion to be spaced from each other at a predetermined distance.

7. A sound generator system of a vehicle, comprising:
a housing with an interior space formed therein;
a cover that encloses the housing;
an exciter inserted the interior space and having a plurality of yokes and a magnetic;
a coil positioned adjacent to the exciter and configured to cause the exciter to vibrate when current is applied thereto;
a main shaft with a first end connected to the housing; a second end penetrating the cover, exposed to an outside, and penetrated and installed into the exciter; and to finally output the vibration generated by the exciter; and
an elastic portion installed adjacent to the exciter and configured to deliver the vibration generated by the exciter to the main shaft,
wherein the elastic portion includes a third plate spring that increases an elastic force and a plurality of mounting members with both end portions of the third plate spring mounted thereto, and
wherein the mounting member has a hollow ring shape and includes a first mounting member with a fixing groove, to which a first end of the third plate spring is fixed, recessed and formed on one surface thereof and a second mounting member with a sliding groove, in which a second end of the third plate spring is slid along the circumferential direction, recessed and formed on one surface thereof; and the fixing groove and the sliding groove are formed at opposite locations.

8. The sound generator system of the vehicle according to claim 7, wherein the third plate spring includes a parallel portion with a first end and a second end formed parallel to the exciter and a center portion that forms a diagonal line in the exciter; and the plurality of mounting members are maintained by the center portion to be spaced from each other at a predetermined height.

9. The sound generator system of the vehicle according to claim 7, wherein the mounting member includes a second fixing portion connected to the main shaft and a second excitation portion excited by the exciter; the second fixing portion and the second excitation portion are connected to each other by a second connecting portion; and the vibration excited by the sliding of the third plate spring within the second excitation portion upon vibration of the exciter is delivered to the main shaft through the second connecting portion and the second fixing portion.

10. A sound generator system of a vehicle, comprising:
a housing with an interior space formed therein;
a cover that encloses the housing;
an exciter inserted the interior space and having a plurality of yokes and a magnetic;
a coil positioned adjacent to the exciter and configured to cause the exciter to vibrate when current is applied thereto;
a main shaft with a first end connected to the housing; a second end penetrating the cover, exposed to an outside, and penetrated and installed into the exciter; and to finally output the vibration generated by the exciter; and
an elastic portion installed adjacent to the exciter and configured to deliver the vibration generated by the exciter to the main shaft,
wherein the elastic portion includes a coil spring that provides an elastic force and an inserting member with a receiving groove, into which the coil spring is inserted and mounted, and
wherein the inserting member includes a third fixing member connected to the main shaft and a third excitation portion excited by the exciter; the third fixing portion and the third excitation portion are formed to be connected to each other by a third connecting portion; and the receiving groove is formed in plurality to be spaced from each other at a predetermined interval on the third excitation portion.

11. The sound generator system of the vehicle according to claim 10, wherein the coil spring is inserted into and mounted to the receiving groove and the height of the coil spring mounted in the receiving groove is formed to be higher than that of the third excitation portion.

* * * * *